United States Patent
Petrich et al.

(10) Patent No.: US 11,565,702 B2
(45) Date of Patent: Jan. 31, 2023

(54) METHOD FOR OPERATING A HYBRID POWERTRAIN

(71) Applicant: ZF Friedrichshafen AG, Friedrichshafen (DE)

(72) Inventors: Florian Petrich, Kressbronn (DE); Robert Reiser, Nenzingen (DE); Oliver Angele, Weingarten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 169 days.

(21) Appl. No.: 16/762,392

(22) PCT Filed: Oct. 10, 2018

(86) PCT No.: PCT/EP2018/077559
§ 371 (c)(1),
(2) Date: May 7, 2020

(87) PCT Pub. No.: WO2019/091685
PCT Pub. Date: May 16, 2019

(65) Prior Publication Data
US 2020/0346652 A1    Nov. 5, 2020

(30) Foreign Application Priority Data
Nov. 8, 2017 (DE) ...................... 10 2017 219 852.4

(51) Int. Cl.
*B60K 6/26*    (2007.10)
*B60K 6/48*    (2007.10)
(Continued)

(52) U.S. Cl.
CPC ............. *B60W 30/192* (2013.01); *B60K 6/26* (2013.01); *B60K 6/387* (2013.01); *B60K 6/48* (2013.01);
(Continued)

(58) Field of Classification Search
CPC .. B60W 30/192; B60W 10/026; B60W 10/08; B60W 20/00; B60W 2510/0283;
(Continued)

(56) References Cited

U.S. PATENT DOCUMENTS 7,500,929 B2    3/2009  Menne et al.
7,766,792 B2 *  8/2010  Lee .......................... B60K 6/48
                                                  192/3.3

(Continued)

FOREIGN PATENT DOCUMENTS

CN    104044590 A    9/2014
DE    10219080 A1    11/2003
(Continued)

OTHER PUBLICATIONS

International Search Report (English Translation) PCT/EP2018/077559, dated Jan. 23, 2019. (2 pages).
German Search Report DE102017219852.4, dated Jan. 25, 2018. (14 pages).
(Continued)

*Primary Examiner* — Stacey A Fluhart
(74) *Attorney, Agent, or Firm* — Dority & Manning, P.A.

(57) ABSTRACT

A method for operating a hybrid drive train of a motor vehicle includes: starting the motor vehicle solely with the aid of an electric machine; engaging a torque converter lockup clutch for rotationally fixing an impeller of a torque converter to a turbine wheel of the torque converter, wherein the turbine wheel is rotationally fixed to the electric machine; and engaging a clutch in order to drivingly connect the impeller to a motor vehicle drive unit, in order to start the motor vehicle drive unit.

7 Claims, 1 Drawing Sheet

(51) Int. Cl.
  *B60W 30/192* (2012.01)
  *B60K 6/387* (2007.10)
  *B60W 10/02* (2006.01)
  *B60W 10/08* (2006.01)
  *B60W 20/00* (2016.01)

(52) U.S. Cl.
  CPC .......... *B60W 10/026* (2013.01); *B60W 10/08* (2013.01); *B60W 20/00* (2013.01); *B60K 2006/4825* (2013.01); *B60W 2510/0283* (2013.01); *B60W 2510/081* (2013.01)

(58) Field of Classification Search
  CPC .......... B60W 2510/081; B60W 10/02; B60W 10/06; B60W 10/10; B60W 20/40; B60K 6/26; B60K 6/387; B60K 6/48; B60K 2006/4825; B60K 2006/268; F16D 2500/10412; F16D 2500/1045; F16D 2500/10487; F16D 2500/1066; F16D 2500/30415; F16D 2500/50808; F16D 2500/7041; F16D 48/08; F16H 61/143
  See application file for complete search history.

(56) References Cited

U.S. PATENT DOCUMENTS

| | | | |
|---|---|---|---|
| 9,695,773 | B2 | 7/2017 | Gibson et al. |
| 10,703,191 | B2* | 7/2020 | Bühle .................... B60W 20/20 |
| 2008/0000746 | A1* | 1/2008 | Schiele ................. B60W 10/02 |
| | | | 903/945 |
| 2009/0017988 | A1 | 1/2009 | Reuschel |
| 2017/0320497 | A1* | 11/2017 | Khafagy ............... B60W 10/02 |
| 2017/0321767 | A1* | 11/2017 | Khafagy ................. F16D 48/06 |

FOREIGN PATENT DOCUMENTS

| | | |
|---|---|---|
| DE | 102006030040 A1 | 5/2008 |
| DE | 102007038236 A1 | 2/2009 |
| DE | 102007058528 A1 | 6/2009 |
| DE | 102008017581 A1 | 10/2009 |
| EP | 2011681 A2 | 1/2009 |
| JP | 2010083231 A | 4/2010 |
| WO | WO 2009/071402 | 6/2009 |

OTHER PUBLICATIONS

Chinese Office Action 201880072143.X, 2022092102289160, dated Sep. 26, 2022. (8 pages).

* cited by examiner

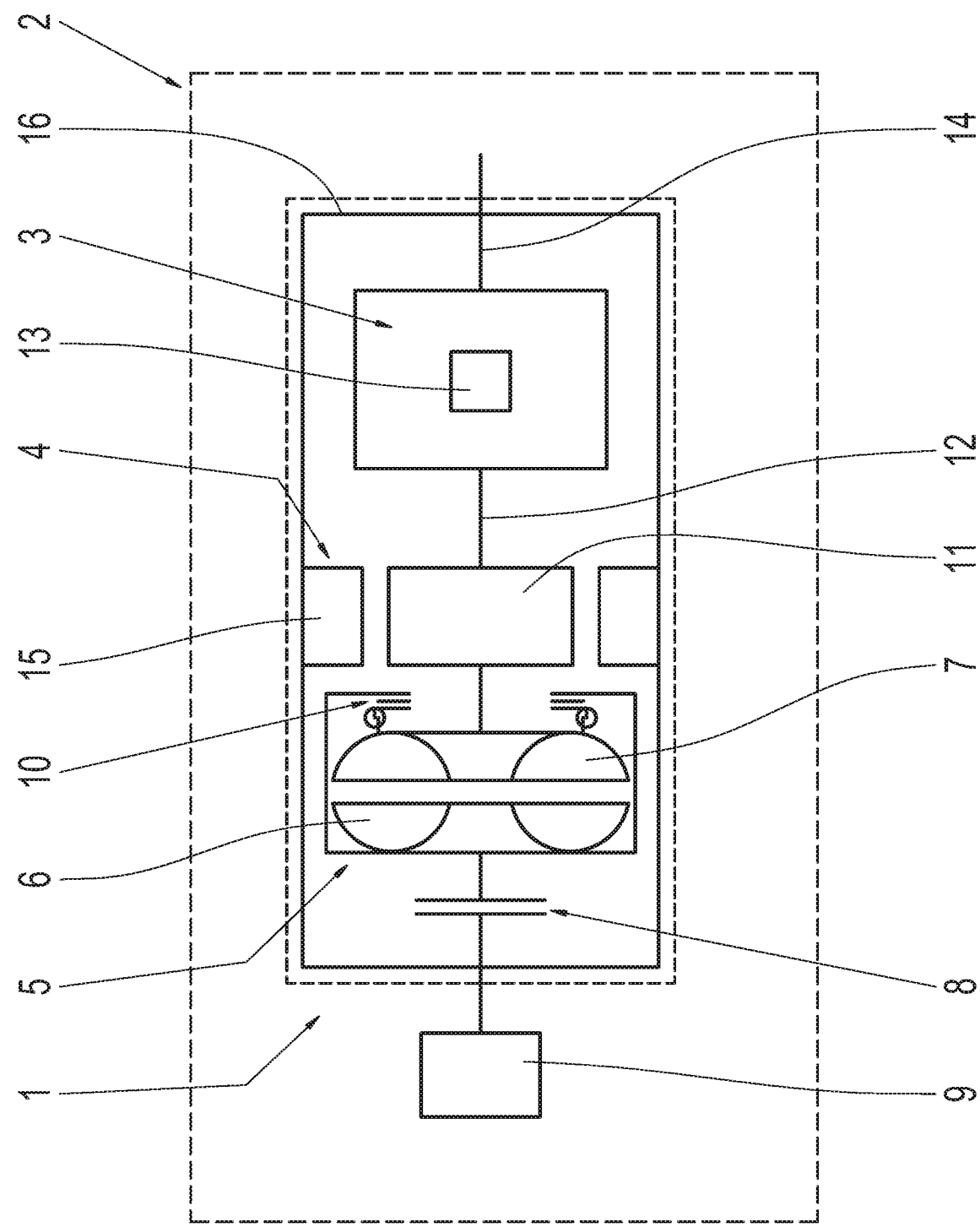

METHOD FOR OPERATING A HYBRID POWERTRAIN

CROSS-REFERENCE TO RELATED APPLICATIONS

The present application is related and has right of priority to German Patent Application No. 10 2017 219 852.4 filed on Nov. 8, 2017 and to PCT International Publication No. WO2019/091685, both of which are incorporated by reference in their entirety for all purposes.

FIELD OF THE INVENTION

The invention relates generally to a method for operating a hybrid drive train of a motor vehicle. In addition, the invention relates generally to a hybrid drive train for a motor vehicle, including a transmission, an electric machine, which is drivingly connected or drivingly connectable to the transmission, and a torque converter, the turbine wheel of which is rotationally fixed to the electric machine.

The invention also relates generally to a motor vehicle including a hybrid drive train according to example aspects of the invention.

BACKGROUND

A plurality of differently designed hybrid drive trains, which are utilized in motor vehicles, is known from the prior art. For example, DE 10 2007 038 236 A1 describes a hybrid drive train in which a motor vehicle drive unit is directly drivingly connected to a starting unit. The starting unit is also drivingly connected to an electric machine. The hybrid drive train also includes a transmission, which is drivingly connected to the electric machine.

The disadvantage of the known embodiment is that the energy needed from the electric machine in order to start the internal combustion engine is high.

SUMMARY OF THE INVENTION

The problem addressed by example aspects of the invention is that of providing a method in which less energy needs to be made available by the electric machine in order to start the motor vehicle drive unit.

In example embodiments, the problem is solved by a method of the type mentioned at the outset, which is characterized by the following steps in the indicated sequence:
a. starting the motor vehicle solely with the aid of an electric machine;
b. engaging a torque converter lockup clutch for rotationally fixing an impeller of a torque converter to a turbine wheel of the torque converter, wherein the turbine wheel is rotationally fixed to the electric machine; and
c. engaging a clutch in order to drivingly connect the impeller to a motor vehicle drive unit, in order to start the motor vehicle drive unit.

As used herein, a rotationally fixed connection is understood to be a connection in which the rotational speeds of the components connected to one another in this way have a fixed ratio with respect to one another. The fixed ratio is one when the interconnected components have the same rotational speed. The rotationally fixed connection can also include a reduction gear having a fixed ratio, for example, a spur gear drive and/or a planetary gear set, so that the fixed speed ratio is not equal to one.

The problem addressed by example aspects of the invention is also that of providing a hybrid drive train in which less energy needs to be made available by the electric machine in order to start the motor vehicle drive unit.

In example embodiments, the problem is solved by a hybrid drive train of the type mentioned at the outset, which is characterized by a clutch for drivingly connecting a motor vehicle drive unit to an impeller of the torque converter.

The arrangement of the clutch upstream from the torque converter and/or drivingly between the torque converter and the motor vehicle drive unit offers the advantage that the impeller of the torque converter is utilizable as a flywheel element for starting the motor vehicle drive unit. As a result, the motor vehicle drive unit can be started in an easy way. In particular, the energy of rotation made available by the electric machine and transmitted to the impeller can be utilized for starting the motor vehicle drive unit. Therefore, a torque component of the electric machine that is greater as compared to known hybrid drive trains is available for driving the vehicle.

The electric machine includes at least a stator and a rotatably mounted rotor and is configured for converting electrical energy into mechanical energy in the form of rotational speed and torque when operated as a motor and for converting mechanical energy into electrical energy in the form of current and voltage when operated as a generator.

The motor vehicle drive unit can also include an internal combustion engine.

In one particular embodiment, the clutch can be disengaged before the motor vehicle is started. As a result, the situation in which the motor vehicle drive unit must be entrained with the aid of the electric machine is avoided in an easy way.

In addition, the torque converter lockup clutch can be disengaged and/or the driving connection between the torque converter and a transmission output shaft can be disconnected before the clutch is engaged. In particular, the disengagement of the torque converter lockup clutch offers the advantage that the energy of rotation of the torque converter is utilized exclusively for driving the motor vehicle drive unit. It is therefore ensured, due to the drive-related disconnection with the aid of the torque converter, that no further components of the hybrid drive train, in particular no transmission components, are driven.

After a starting operation of the motor vehicle drive unit, the torque converter lockup clutch can be engaged. The engagement of the torque converter lockup clutch therefore takes place at a point in time at which the starting operation of the motor vehicle is already finished and/or the motor vehicle drive unit has been started. In an engaged condition of the torque converter lockup clutch, no torque conversion takes place in the torque converter. This means, the rotational speed and the torque of the impeller and of the turbine wheel are equal when a torque converter lockup clutch is engaged.

The clutch can be engaged when the rotational speed of the impeller corresponds to the rotational speed of the rotor of the electric machine. At this point in time, the torque converter, in particular the impeller, has the greatest energy of rotation, which is advantageous for the start of the motor vehicle drive unit.

In one particular example embodiment, the impeller is rotationally fixable to the turbine wheel with the aid of the torque converter lockup clutch. The impeller can be always connected to the clutch, in particular to a clutch component. In addition, the impeller can be drivingly connectable to the motor vehicle drive unit with the aid of the clutch. The impeller is drivingly and/or directly connected to the motor vehicle drive unit when the clutch is engaged.

The rotor of the electric machine can be always connected to the turbine wheel in a driving manner, in particular in a rotationally fixed manner, and/or directly. Thus, it is ensured in an easy way that the electric machine can drive the turbine wheel. A transmission input shaft of the transmission can also be always connected to the rotor in a driving manner, in particular in a rotationally fixed manner, and/or directly.

In one particular example embodiment, a shift element, in particular a frictional shift element, can be present, with the aid of which the driving connection between the turbine wheel and the transmission output shaft is disconnectable. The shift element can be an integral part of the transmission.

The transmission can be an automatic transmission. In addition, the transmission can include multiple gear sets and/or shift elements, with the aid of which multiple gears having different ratios can be implemented between the transmission input shaft and the transmission output shaft of the transmission. The transmission input shaft can be drivingly connected or drivingly connectable to the gear sets. In addition, the different gears can be implemented by engaging a single shift element or multiple shift elements.

Of particular advantage is a motor vehicle including a hybrid drive train according to example aspects of the invention, and the motor vehicle drive unit. The motor vehicle drive unit is drivingly connectable to the torque converter with the aid of the clutch. The motor vehicle drive unit is drivingly connected to the torque converter when the clutch is engaged.

BRIEF DESCRIPTION OF THE DRAWINGS

The subject matter of the invention is diagrammatically represented in the FIGURE. Wherein:

FIG. 1 shows a schematic of a motor vehicle including a hybrid drive train according to example aspects of the invention.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The hybrid drive train 1 of a motor vehicle 2 represented in FIG. 1 includes a transmission 3, an electric machine 4, and a torque converter 5. The transmission 3 is drivingly connected to the electric machine 4. In particular, a transmission input shaft 12 is drivingly connected to a rotor 11 of the electric machine 4. The electric machine 4 also includes a stator 15, which is rotationally fixed to a fixed housing 16. The electric machine 4 is designed as an internal rotor, by way of example. Alternatively, an embodiment as an external rotor is possible.

The torque converter 5 includes an impeller 6 and a turbine wheel 7. The turbine wheel 7 is rotationally fixable to the impeller 6 with the aid of a torque converter lockup clutch 10. In addition, the turbine wheel 7 is always connected to the rotor 11 in a driving manner, in particular in a rotationally fixed manner.

The hybrid drive train 1 includes a clutch 8, with the aid of which the impeller 6 is drivingly connectable to the motor vehicle drive unit 9. The impeller 6 is always drivingly connected to the clutch 8, in particular to a clutch component.

The transmission 3 includes a shift element 13, with the aid of which the driving connection between the turbine wheel 7 and a transmission output shaft 14 is disconnectable. The transmission 3 also includes further shift elements and gear sets, which are not represented in FIG. 1.

An operation of the hybrid drive train 1 is described in the following. In particular, the way in which a starting of the motor vehicle drive unit 9 can be implemented in the case of the hybrid drive train 1 is described.

Initially, the electric machine 4 is energized and the motor vehicle 2 is driven in a purely electric manner. In this operating condition of the hybrid drive train 1, the clutch 8 is disengaged. Thereafter, the torque converter lockup clutch 10 is engaged in order to achieve a rotationally fixed connection between the impeller 6 and the turbine wheel 7. Since the turbine wheel 7 is drivingly connected to the rotor 11 of the electric machine 4, the rotor 11 drives the turbine wheel 7 and, therefore, the impeller 6 as well. In this operating condition, the impeller 6 is therefore driven by the turbine wheel 7.

At a point in time at which the impeller 6 has the rotational speed of the rotor 11 of the electric machine 4, the torque converter lockup clutch 10 and/or the shift element 13 are/is disengaged. In addition, the clutch 8 is engaged in order to implement a driving connection of the impeller 6 to the motor vehicle drive unit 9. The motor vehicle drive unit 9 is driven by the impeller 6, and the motor vehicle drive unit 9 is started.

A starting operation of the motor vehicle 2 with the aid of the motor vehicle drive unit 9 can take place as follows. Initially, the clutch 8 can be engaged and a starting operation of the motor vehicle 2 can take place via the torque converter 5. In this operating condition, the motor vehicle drive unit 9 drives the impeller 6. In addition, the impeller 6 drives the turbine wheel 7, wherein the torque converter lockup clutch 10 is disengaged. After a starting operation of the motor vehicle 2, the torque converter lockup clutch 10 is engaged.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS

1 hybrid drive train
2 motor vehicle
3 transmission
4 electric machine
5 torque converter
6 impeller
7 turbine wheel
8 clutch 9 motor vehicle drive unit
10 torque converter lockup clutch
11 rotor
12 transmission input shaft
13 shift element
14 transmission output shaft
15 stator
16 housing

The invention claimed is:

1. A method for operating a hybrid drive train (1) of a motor vehicle (2), comprising:

starting the motor vehicle (2) solely with an electric machine (4);

after starting the motor vehicle (2), engaging a torque converter lockup clutch (10) for rotationally fixing an impeller (6) of a torque converter (5) to a turbine wheel (7) of the torque converter (5), the turbine wheel (7) rotationally fixed to the electric machine (4); and after engaging the torque converter lockup clutch (10), engaging a clutch (8) in order to drivingly connect the impeller (6) to a motor vehicle drive unit (9) and thereby start the motor vehicle drive unit (9).

2. The method of claim 1, wherein the clutch (8) is disengaged before starting the motor vehicle (2).

3. The method of claim 1, further comprising disengaging the torque converter lockup clutch (10) before engaging the clutch (8).

4. The method of claim 3, further comprising engaging the torque converter lockup clutch (10) after starting the motor vehicle drive unit (9).

5. The method of claim 1, wherein a driving connection between the torque converter (5) and a transmission output shaft (14) is disconnected before engaging the clutch (8).

6. The method of claim 1, wherein engaging the clutch (8) comprises engaging the clutch (8) when a rotational speed of the impeller (6) of the torque converter (5) corresponds to a rotational speed of a rotor (11) of the electric machine (4).

7. A hybrid drive train (1) configured for implementing the method of claim 1.

* * * * *